(12) United States Patent
Nejezchleb et al.

(10) Patent No.: US 6,309,610 B1
(45) Date of Patent: *Oct. 30, 2001

(54) NON-THERMAL PLASMA APPARATUS UTILIZING DIELECTRICALLY-COATED ELECTRODES FOR TREATING EFFLUENT GAS

(75) Inventors: Allen J. Nejezchleb, Austin, TX (US); Keith C. Jamison, Destin, FL (US); John W. Rogers, Shalimar, FL (US); Steven P. Federle, Mary Esther, FL (US); Donald M. Littrell, Ft. Walton Beach, FL (US)

(73) Assignee: Science Applications International Corporation, San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,669

(22) Filed: May 27, 1998

(51) Int. Cl.[7] .............................. B01J 19/08; A62D 3/00
(52) U.S. Cl. ..................... 422/186.04; 588/247; 204/177
(58) Field of Search .................................. 204/164, 177; 422/186.04, 906, 907; 588/247

(56) References Cited

U.S. PATENT DOCUMENTS

| 4,841,409 | | 6/1989 | Kalwar ................................. 361/230 |
| 4,954,320 | | 9/1990 | Birmingham ................... 422/186.04 |
| 5,490,973 | | 2/1996 | Grothaus et al. ............... 422/186.04 |
| 5,545,380 | * | 8/1996 | Gray ................................. 422/186.07 |
| 5,807,466 | * | 9/1998 | Wang et al. ......................... 204/177 |
| 5,827,488 | * | 10/1998 | Babu et al. .......................... 432/235 |
| 5,837,867 | * | 11/1998 | Lin et al. ............................. 540/200 |
| 5,872,426 | * | 2/1999 | Kunhardt et al. .................... 313/582 |
| 6,139,694 | * | 10/2000 | Rogers et al. ........................ 204/177 |

* cited by examiner

Primary Examiner—Stephen Kalafut
Assistant Examiner—Jonathan Crepeau (57) ABSTRACT

An improved non-thermal plasma apparatus for treating $NO_x$ bearing gas streams has a plasma reactor and an inlet and outlet. The plasma reactor is equipped with a plurality of dielectrically-coated electrodes between which a selected voltage is applied to generate a non-thermal plasma environment for driving selected electrochemical reactions. A predefined voltage is applied across the electrodes to create microdischarges in the exhaust gas stream to convert nitric oxides into primarily nitrogen dioxides. At least a portion of the gas is diverted through an ethanol bath before entering the reactor. The dielectric is preferably a fluoropolymeric substance.

20 Claims, 3 Drawing Sheets

NON-THERMAL PLASMA APPARATUS UTILIZING DIELECTRICALLY-COATED ELECTRODES FOR TREATING EFFLUENT GAS

CONTRACTUAL ORIGIN OF THE INVENTION

The United States Government may have rights in this invention pursuant to the Cooperative Research And Development Agreement ("CRDA") between Science Applications International Corporation and the Air Force Wright Laboratory Armament Directorate.

FIELD OF THE INVENTION

This invention relates to an improved apparatus for treatment of hazardous gases, in particular, an improved non-thermal plasma apparatus for the removal of $NO_x$ from gas streams resulting from various chemical processes and by the combustion of carbonaceous fuels.

BACKGROUND AND SUMMARY OF THE INVENTION

The current global concern for the environment has generated a strong need by both government and industry for technologies that reduce emissions of $NO_x$. $NO_x$ are primary contributors to photochemical smog and acid rain, and may deplete the ozone layer. Up to millions of tons of nitrogen oxides, generally denoted herein as "$NO_x$," are emitted into the atmosphere each year as a result of numerous industrial and military processes, ranging from high temperature combustion of fossil fuels, to explosive manufacturing and munitions disposal processing and further to operations of powered aerospace ground equipment.

The impact of such emissions on human health and the environment in general has been the subject of intense study and public debate and legislative action to mandate safer emissions has already been enacted. For example, the Clean Air Act Amendment of 1990 mandates that emission generating industrial plants develop and/or implement techniques to significantly reduce their emissions of $NO_x$. Such legislation affects power plants, iron and steel plants, pulp and paper mills, acid production plants, petroleum refineries, lime plants, fuel conversion plants, glass fiber processing plants, charcoal production plants, cement plants, copper smelters, coal cleaning plants, etc.

Developmental efforts have been directed to converting $NO_x$ to the individual elemental diatoms, $N_2$ and $O_2$. Conventional processes typically utilized thermal techniques for generating very high temperature conditions within a reactor. These techniques are highly inefficient as excessively high electrical power is needed not only to treat relatively low pollutant concentrations, but to cool the resultant effluent emerging from the reactor.

Electron beam irradiation has also been used in various forms to convert to the individual elemental diatoms. Such systems also use electron beams or ultraviolet light to oxidize the $NO_x$. The ionization caused by the electron beam irradiation converts the $NO_x$ to acid mist at low temperatures and/or solid particles at high temperatures which may be removed by conventional methods employing filters and scrubbers. However, due to potential harm to operation personnel, costly and elaborate shielding measures must be employed.

Numerous research agencies have investigated the use of non-thermal plasma devices ("NTPDs") to reduce $NO_x$ in gas streams. These devices employ electrodes and dielectrics driven by a voltage supply for generating an electric field driving electrochemical reactions converting $NO_x$ to other atomic and molecular forms, either chemically less toxic, and/or structurally more readily removed from the gas stream. Numerous materials have been used to construct such dielectrics, including quartz, glass, alumina, mullite, and oxide free ceramic such as silicon nitrite, boron nitrite, aluminum nitrite.

Of the conventional non-thermal plasma devices, the dielectrics isolating the electrodes from the gas and enabling the non-thermal plasma environment which drives various electrochemical reactions are typically constructed of glass. While glass has the required thermal and electrical properties, it fractures easily and may not be well suited for any mobile applications of non-thermal plasma devices. In addition, an appreciable thickness of glass is typically used to standoff the voltages applied, which limits the flow rate or throughput of the devices. As for the other conventional dielectric materials, many have suitable dielectric strength and many have suitable working temperatures; however, none combine both of these factors in providing a desirable dielectric for use in an efficient effluent gas treating non-thermal plasma apparatus.

Accordingly, there exists a demand for an improved non-thermal plasma apparatus for treating $NO_x$ bearing gas streams, with significantly improved efficiency and durability. It is also desired that such an apparatus has significantly increased applicability and ease of application. In accordance with the present invention, a non-thermal plasma apparatus is provided, having a plasma reactor and an inlet and outlet connected thereto through which the exhaust gas enters and leaves the plasma reactor. A scrubber may be provided to scrub the exhaust gas leaving the plasma reactor and a stack may be connected to the scrubber to permit the exhaust gas to exit the apparatus. The plasma reactor is equipped with a plurality of dielectrically-coated electrodes between which a selected voltage is applied to generate a non-thermal plasma environment for driving selected electrochemical reactions. A voltage supply is electrically configured to apply a predefined voltage across the electrodes to create microdischarges in the exhaust gags stream. Where such electrochemical reactions involve the conversion of nitric oxides to various diatomic and molecular forms, including primarily nitrogen dioxide, the efficiency (in terms of energy per molecule of remediated $NO_x$) and total reduction (in terms of percentage of hazardous compounds reduced per treatment pass) may be increased by approximately 30% when compared with conventional non-thermal plasma devices.

Operating with improved efficiency and durability, the non-thermal plasma apparatus utilizes the dielectrically-coated electrodes of the plasma reactor to drive the desired conversions. In that regard, the electrodes are constructed of metal plates that are coated with a fluoropolymeric material, such as fluorocarbon. Depending on the level of contamination in the exhaust gas and the flow rate of the exhaust gas, a selected thickness of fluorocarbon coating is applied to the planar surfaces of the plate, forming "double-dielectric" electrodes. In one embodiment, a plurality of such double-dielectric electrodes are used in the plasma reactor, arranged in parallel formation and alternating between positive and negative charges. Fluoropolymeric (e.g., fluorocarbon) spacers are positioned between adjacent double-dielectric electrodes and may be configured with selected thicknesses to provide a plurality of desired reaction zones or gaps therebetween. With a plurality of gaps, the total non-thermal plasma environment is expanded to increase the overall flow rate of the exhaust gas or throughput of the apparatus.

In another embodiment, a plurality of double-dielectric electrodes may be supported on a specially configured fluoropolymeric (e.g., fluorocarbon) insulators adapted for placement inside the plasma reactor. In particular, the insulators may be configured with grooves or indentations which support the double-dielectric electrodes at their edge portions, in parallel formation, alternating between positive and negative charges. The grooves may be configured to be spaced apart at selected distances such that adjacent double-dielectric electrodes may provide a plurality of desired reaction zones or gaps. Again, with a plurality of gaps, the total non-thermal plasma environment is expanded to increase the overall flow rate of the exhaust gas or throughput of the apparatus.

The non-thermal plasma apparatus of the instant invention may provide for the pretreatment of the exhaust gas with ethanol, either by vapor absorption or direct vapor injection. In particular, before the exhaust gas is exposed to plasma reactor, at least a portion of the exhaust gas is exposed to ethanol before entering the plasma reactor. One method involves diverting at least a portion of the exhaust gas through an ethanol bath before the exhaust gas enters the plasma reactor. Another method involves directly injecting ethanol directly into the path of the exhaust gas before it enters the plasma reactor.

For either method, the high vapor pressure of ethanol permits a significant portion of the ethanol to be absorbed by the exhaust gas. As such, the ethanol-bearing exhaust gas is pretreated in preparation for the plasma reactor. In particular, the plasma reactor exposes to the pretreated exhaust gas to reactive species generated by the plasma reactor, e.g., oxygen atoms, whereupon nitric oxides are converted to a variety of products, including primarily nitrogen dioxide, with significantly improved efficiency. As an added advantage, the solubility of ethanol permits the ethanol to be readily scrubbed from the exhaust gas downstream of the plasma reactor, along with the converted nitrogen dioxide.

To implement the ethanol pretreatment, the non-thermal plasma apparatus comprises an inlet and an outlet connected to the reaction chamber, permitting the exhaust gas to enter and leave the reaction chamber. In one embodiment, the inlet is further connected to a diverter equipped with an injector, which diverts a portion of the gas stream through an ethanol bath before reinjecting the ethanol-bearing gas stream into the inlet. Ethanol is readily absorbed by the gas stream as it passes through the ethanol bath.

In another embodiment, the inlet is equipped with an injector which receives a supply of ethanol that is sprayed as a fine mist directly into the gas stream. The fine mist of ethanol is substantially uniformly absorbed by the gas stream before it enters the reactor chamber. A reservoir stores the ethanol which is delivered to the injector by a metered pump.

The non-thermal plasma treatment may be used for a variety of gas streams. A typical gas stream contains approximately nitrogen, oxygen, water vapor and nitric oxide. The primary function of the treatment is to convert the nitric oxide into nitrogen dioxide.

These, as well as other features of the invention, will become apparent from the detailed description which follows, considered together with the appended drawings.

DESCRIPTIONS OF THE DRAWINGS

In the drawings, which constitute a part of this specification, exemplary embodiments demonstrating various features of the invention are set forth as follows.

DESCRIPTION OF THE ILLUSTRATIVE EMBODIMENTS

As indicated above, detailed illustrative embodiments are disclosed herein. However, structures for accomplishing the objectives of the present invention may be detailed quite differently from the disclosed embodiments. Consequently, specific structural and functional details disclosed herein are merely representative; yet, in that regard, they are deemed to afford the best embodiment for purposes of disclosure and to provide a basis for the claims herein which define the scope of the present invention.

Figure 1A:
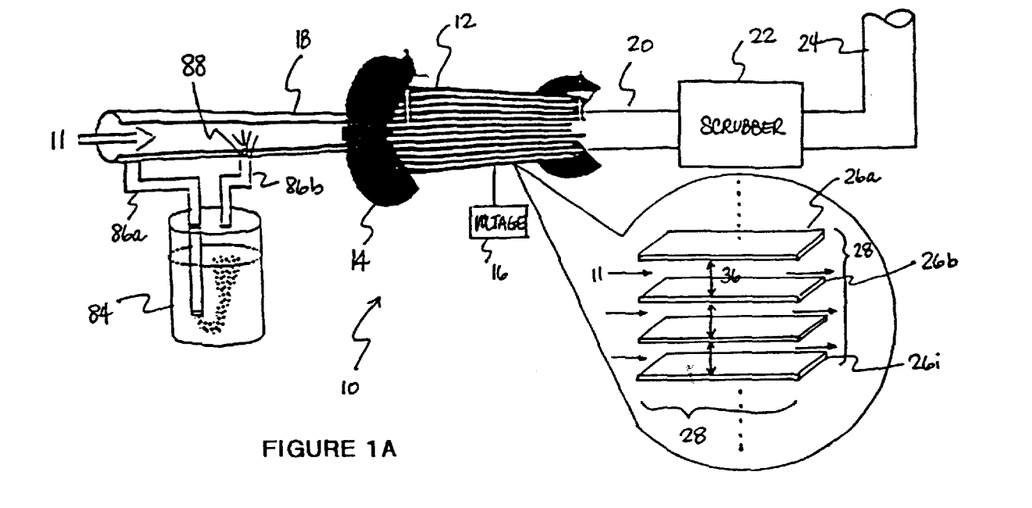
FIG. 1A is a perspective view of an embodiment of a non-thermal plasma apparatus.

Referring to FIG. 1A, a non-thermal plasma apparatus 10 for treating effluent or exhaust gas 11 containing nitric oxides ("$NO_x$") is illustrated. The apparatus includes a plasma reactor 12 having a plasma chamber or reaction chamber 14, connected to a voltage supply 16. An inlet 18 (shown partially broken away) and an outlet 20 are connected to opposing ends of the chamber 14, allowing the gas 11 to enter and exit the chamber 14. A scrubber 22 is provided below or downstream from the plasma reactor 12, for the removal of soluble constituents from the gas 11. The scrubber 22 may ultimately lead to a stack 24 to release the exhaust gas 11 from the apparatus 10.

A variety of exhaust gases may be treated by the apparatus 10. For example, a suitable exhaust gas for treatment may contain 82% nitrogen, 15% oxygen, 3% water vapor, and approximately 1000 ppm nitric oxide (NO). A primary function of the apparatus 10 is to convert the nitric oxide (NO) into nitrogen dioxide ($NO_2$). In certain instances, particularly where a preinjectant such as ethanol is used, the nitric oxide (NO) may be converted to primarily to nitrogen dioxide (NO2) and some nitric acid (HNO3). In addition, small amounts of the compounds peroxy acetyl nitrate, acetaldehyde, and n-propyl nitrate may also be produced.

The desired conversions are driven by electro-chemical reactions facilitated by the plasma reactor 12 of the apparatus 10. These reactions are non-thermal or "cool" reactions in that the dispersed electron charge or electric field (i.e., a "corona") generated by the plasma reactor energizes primarily the electrons, substantially leaving the constituents of the gas relatively unenergized or "unheated." As such, the energized electrons enhance the electron density of the gas as it travels through the plasma reactor 12, promoting electron-molecule collision, as opposed to molecule-molecule collision. Such charge dispersion and electron concentration drive the desired conversion of nitric oxides to other atomic and molecular forms, either chemically less toxic, and/or structurally better suited for removable or separation from the gas stream 11.

Figure 1B:
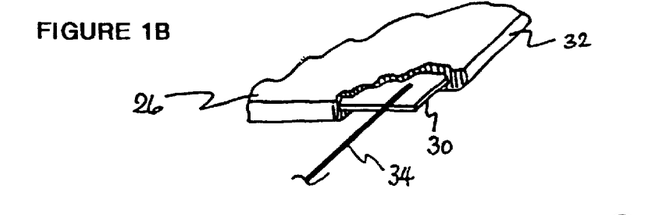
FIG. 1B is a partial perspective view of an embodiment of a dielectrically-coated (double-dielectric) electrode.

In accordance with a feature of the present invention, the plasma reactor 12 includes at least a pair of dielectrically-coated electrodes 26a and 26b and defining a non-thermal plasma environment or reaction zone 28 therebetween. As shown in FIG. 1B, the electrode has a planar configuration and includes a metal electrode plate 30 covered with a coating 32 of a fluoropolymeric substance, for example, fluorocarbon. The coating 32 isolates the electrode plate 30 from the exhaust gas 11 and its nonconductive nature enables it to standoff a defined level of voltage that is applied to the electrode plate. The voltage is applied by the voltage 16 supply via a wire 34 that is attached to the plate 30 and extends through the coating 32. In contrast to conventional materials from which dielectrics may be made (e.g., such as quartz, glass, alumina, mullite, and oxide free ceramic such as silicon nitrite, boron nitrite, aluminum nitrite), fluoropolymers, and especially fluorocarbons, may be readily applied to the surface of the electrode plate 30 to constitute the coating 32. The thickness of the coating 32 may vary depending on the level of contamination of the gas and the flow rate. Fluorocarbon tapes, commercially available under the names of TEFLON®, TEFLON® PFA, and DYKOR® may be applied directly to the electrode plates. Moreover, TEFLON® PFA—coated plate electrodes are available from Toefco Engineering, Inc., Niles, Mich.

The apparatus 10 utilizing the coated electrodes 26a and 26b has improved overall durability, when compared to conventional non-thermal plasma devices. The relatively high tensile strength of fluoropolymers, in particular, fluorocarbon, renders the coated electrodes more ductile and therefore offers greater protection against breakage. Significantly, the apparatus 10 offers improved durability with relatively little change in electrical and thermal performance.

The plasma reactor 12 may utilize more than the coated electrodes 26a and 26b. In particular, as illustrated in FIG. 1, the reaction chamber 14 may house a plurality of coated electrodes 26i which are arranged in parallel formation, alternating between positively-charged and negatively-charged electrodes. The number of electrodes also varies depending on the level of contamination in the gas and the flow rate of the gas.

It can be seen that the electrodes 26i are each coated on both surfaces of the underlying plate 30i. Accordingly, the plates of adjacent alternating high and low electrodes remain coated and isolated from the gas. These electrodes may be referred to as "double-dielectric" electrodes. The voltage supply 16 may supply voltage to all the electrodes, such that the reaction zone 28 of the apparatus is expanded to include all gaps 36 in between each adjacent pairs of high and low electrodes 26i. Such a voltage supply is available from Elgar Corporation, San Diego, Calif., under part #1001SL-11.

In operation, the exhaust gas 11 may be forced or drawn through the apparatus 10 by an induction fan (now shown), including through the inlet 18, the plasma chamber 14, the outlet 18, the scrubber 22 and the stack 24, as understood by those of ordinary skill in the art. The exhaust gas 11 enters the apparatus 10 through the inlet 18 which terminates at the plasma reactor 12. Once inside the plasma chamber 14 of the plasma reactor 12, the gas 11 is exposed to the electric field between the electrodes 26i of the reactor 12 as generated by the selected voltage applied by the voltage supply 16. The strength of the electric field is above the critical field strength of the exhaust gas 11, but not so high as to establish a condition conducive to sustain arcing between the electrodes 26i. In particular, the selected voltage creates a multitude of short-lived current filaments or breakdown channels (commonly called microdischarges) within the gas inside the reaction zone 28.

Regardless of the configuration of the electrodes, the flow of electrons at high velocity and in high density increase the likelihood of an $NO_x$ reduction producing collision. Specifically, after a discharge extinguishes, the reactive species, e.g., oxygen atoms, diffuse out of the channels into the rest of the gas stream in the reaction zone 28 (i.e., in between each of the gaps 36) where they drive the desired conversions. Because the energy of the discharge is used to directly accelerate the electrons, rather than heating the gas 11, the apparatus 10 provides an attractive technique for selectively driving specific chemical reactions. In this regard, the apparatus 10 has applications beyond the specific chemical reaction discussed herein.

Figure 3A:
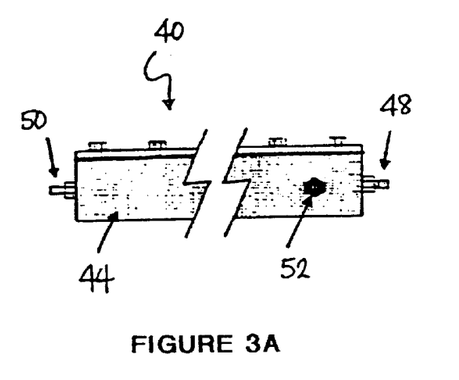
FIGS. 3A and 3B are a side elevational view and an end elevational view of an embodiment of a non-thermal plasma reactor utilizing double-dielectric electrodes.
Figure 3B:
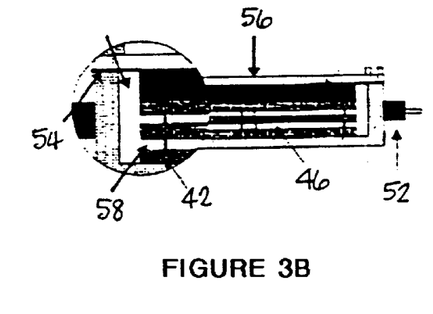

Referring to FIGS. 3A and 3B, a planar, variable gap, non-thermal plasma reactor 40 for use with the apparatus 10 is illustrated. In particular, two to five double-dielectric electrodes 42 are provided in the reactor's chamber 44 and arranged in parallel formation such that the gas 11 is directed through gaps 46 between the electrodes 42.

The chamber 44 in FIGS. 3A and 3B is constructed of aluminum with penetrations for the inlet 48 and the outlet 50 and high and low voltage terminals 52. Such inlet/outlet coupling and connection devices are commercially available from The Swagelok Companies, Solon, Ohio. The interior of the chamber is overlaid with KAPTON® high voltage tape and the upper portion is sealed with a rubber gasket 54 and a Plexiglas cover 56. The electrodes 42 may range between approximately 6" to 8" wide by approximately 22" to 24" long, by approximately 0.09" to 1.25" thick. The electrodes 42 are configured to alternate between positive (high) or negative (low) charges and are separated by fluorocarbon spacers 58 to provide the desired gaps 46. The thickness of the fluoropolymer-based coating 32 on the electrodes, as well as the thickness of the spacers 58, may be varied to vary the width of the gaps 46. A suitable gap width may range between approximately 0.5 to 3.0 mm, rendering the total active volume of the reaction zone of the plasma reactor 40 to range between 50.0 to 1,500 ml.

Depending on the capacity of the reactor 40, the flow rate of the apparatus may vary up to approximately 400 cubic feet per minute. As such, the residence time of the mixed gas in the reaction chamber 44 may range between 0.1 to 60.0 seconds, for example, approximately 0.3 seconds.

Figure 4A:
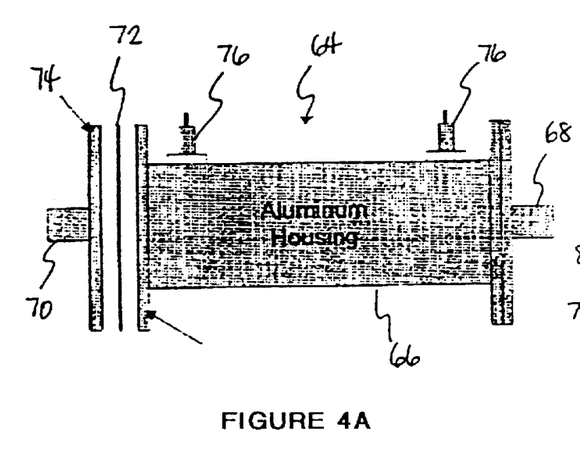
FIGS. 4A and 4B are a side, partially exploded, elevational view and an end elevational view of another embodiment of a non-thermal plasma reactor utilizing double-dielectric electrodes.
Figure 4B:
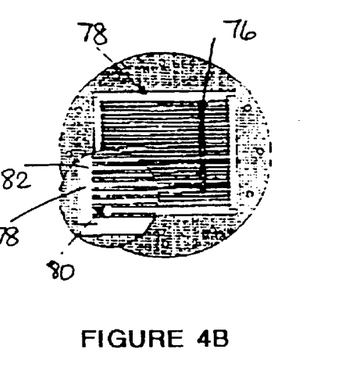

Another plasma reactor 64 that may be used with the apparatus 10 is illustrated in FIGS. 4A and 4B. A reactor chamber 66 of the reactor 64 is again constructed of aluminum and defines an interior region measuring approximately 8" by 8". The chamber 66 is approximately 31" in length and is fitted with an inlet 68 and an outlet 70. Silicone rubber gaskets 72 and end caps 74 (one shown in exploded view) are provided. A glass window (not shown) may be fitted in the end caps included to permit viewing of the interior of the chamber. Ceramic and copper high voltage terminals 76 are also provided.

Insulating the interior of the reactor chamber 66 is a fluorocarbon member 78 configured with grooves 82 of selected dimensions to receive and support edge portions of double-dielectric electrodes 80 in a desired arrangement. Different insulating members may be used with the reactor 64, configured with different separation distances between the grooves 82. Accordingly, different desired gap dimensions may be attained. Supported on its edge portions, the electrodes 80 can readily slide in and out of the chamber 66. The electrodes 80 are arranged in alternating high and low configuration and connected to the high voltage terminals 76 at opposite ends of the chamber 66.

It bears emphasis that the plasma reactor of the apparatus 10 is non-thermal in that there is a cool discharge promoting the free flow of electrons. Significantly, only the electrons gain appreciable energy in the reaction zone(s) or gap(s) and hence increased temperature is experienced primarily by the electrons, leaving the remaining constituents of the gas stream substantially unheated. The energy is generally evenly distributed over the non-thermal plasma environment; any hot discharge is typically a localized point to point arc.

| Material | Dielectric Constant | Dielectric Strength (kV/mm) | Tensile Strength (kpsi) | Working Temp. (C.) |
|---|---|---|---|---|
| PFA TEFLON ® | 2.1 | 60 | 2.20 | 260 |
| PYREX ® glass | 4.5 | 13 | 0.14 | 450 |

While the dielectric constant of PFA TEFLON® is comparable to that of PYREX® glass, the dielectric strength is much higher. In view of this observation, the thickness of a PFA TEFLON® coating can be less than that used for PYREX®, leaving more volume for the gas stream. The desirable working temperature of PFA TEFLON® is lower than that for PYREX®, however, it remains sufficient for treating most types of contaminated gas. As previously noted, the PFA TEFLON® provides relatively high tensile strength, rendering the electrodes ductile and less susceptible to breakage, thus improving the efficiency and durability of the apparatus.

Experimental results presented in Table 2. also demonstrates an improvement in efficiency when the apparatus 10 is used to treated NO-bearing exhaust stream from a diesel generator.

TABLE 2

Increased Efficiency of Fluorocarbon Dielectric in NO Conversion

| Material | Power (Watts) | Flow (liters per minute) | Percentage Conversion NO to $NO_2$ | eV/molecule Converted |
|---|---|---|---|---|
| PFA TEFLON ® | 48 | 100 | 100 | 17 |
| PYREX ® Glass | 48 | 100 | 66 | 22 |

As also mentioned, the addition of ethanol ($C_2H_5OH$) into the exhaust gas significantly enhances the efficiency of the conversion in terms of the electrical power used to drive the conversion.

Referring back to FIG. 1, an ethanol bath 84 is provided to improve the efficiency of the conversion process. A diverter 86 is connected to the inlet 18, having a first section 86a extending from the inlet 18 to the ethanol bath 84 and a second section 86b extending from the ethanol bath 84 to the inlet 18. At the junction between the second section 86a and the inlet 18, an injector 88 is provided above or upstream from the plasma reactor 12. In operation, the apparatus 10 diverts a portion of the exhaust gas 11 through the diverter 86 to pass through the ethanol bath 84. Due to the high vapor pressure of ethanol ($C_2H_5OH$), the ethanol is vaporized along with and mixed into the gas stream. As the ethanol-bearing gas reaches the injector 88, it is injected into the inlet 18 to mix with the gas in the inlet.

Figure 2:
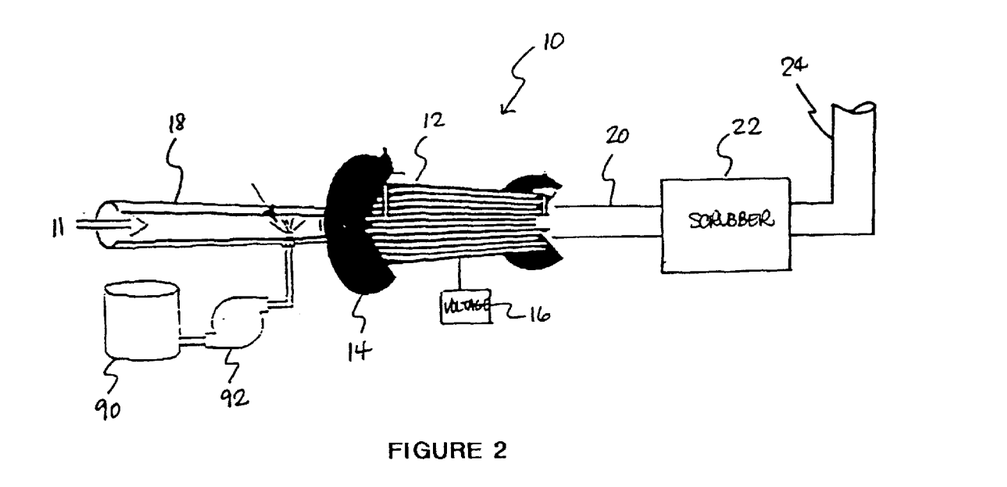
FIG. 2 is a perspective view of another embodiment of a non-thermal plasma apparatus.

Referring to FIG. 2, an alternative embodiment of the non-thermal plasma apparatus 10 is illustrated. The injector 88 remains upstream from the plasma reactor 12, but is fed directly with ethanol stored in a reservoir 90 and delivered via a metered pump 92. The ethanol is injected into the gas in the inlet as a fine mist that evaporates substantially uniformly into the gas stream 11. A small varistaltic pump available from Manostat Corporation, Barrington, Ill., under Model #72-305-000, may be used.

Referring to both FIGS. 1 and 2, as the gas stream (ethanol-bearing or not) approaches the plasma reactor 12, a non-thermal plasma environment is prepared in the reaction chamber 14. The non-thermal plasma environment of the reaction zone 28 contains generated reactive agents, in particular, energetic electrons, to drive selected electrical and/or chemical reactions in the gas, which are discussed in detail further below.

It has been observed that low energy gaseous plasma exhibit physical and chemical properties different than their normal properties. One such property is extreme chemical reactivity, which as discussed above, involves free electrons being energized in the electrical field or corona until the electrons attain sufficient energy to cause ionization of some of the gas molecules. Reactions for $NO_x$ reduction using the free electron e may be as follows:

$O_2+e \rightarrow 2O+e$ $N_2+e \rightarrow 2N+e$ $NO+e \rightarrow NO^*$ $NO^*+NO \rightarrow NO_2+N+e$ $NO^* \rightarrow N+O+e$ $N+O \rightarrow NO$ $N+N \rightarrow N_2$ $NO+O \rightarrow NO_2$ $2NO_2 \rightarrow N_2+2O$ With the pre-injection of ethanol ($C_2H_5OH$) in accordance with feature of the present invention, several additional molecular compounds are possible, such as nitric acid ($HNO_3$) and even small amounts of peroxy acetyl nitrate, acetaldehyde, and n-propyl nitrate.

Figure 5:
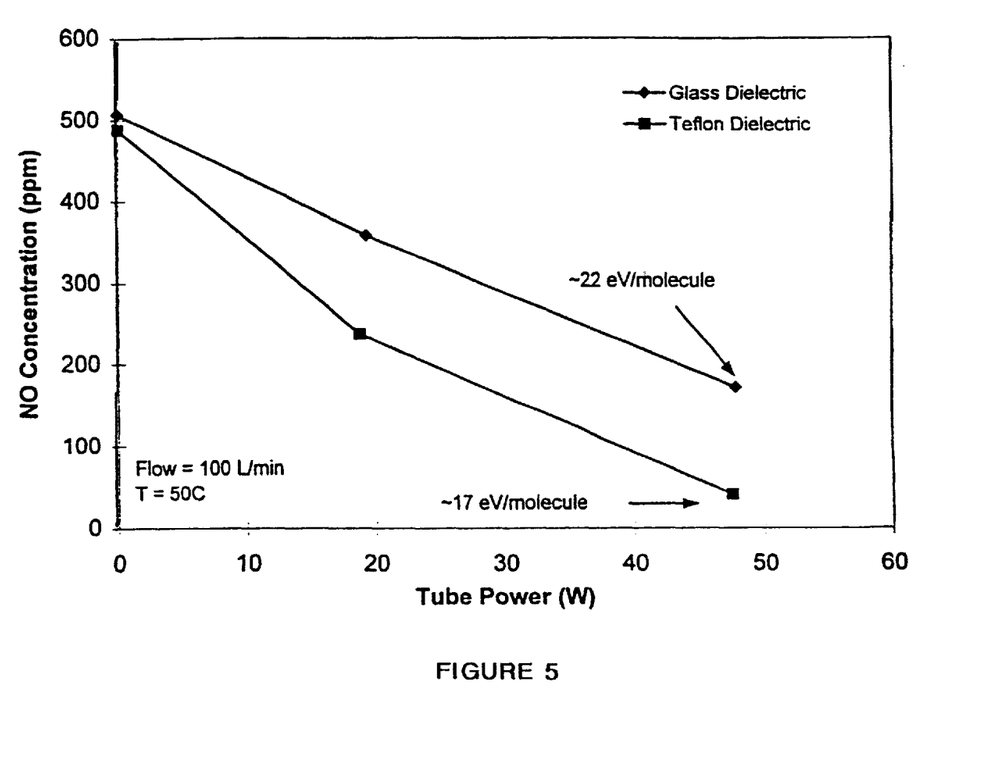
FIG. 5 is a graph of NO concentration as function of power of a non-thermal plasma apparatus.

The use of ethanol as a pre-injectant increases the efficiency of the non-thermal plasma apparatus by as much as a factor of ten. The combined use of ethanol injection and fluorocarbon dielectrics further increases efficiency. Referring to FIG. 5, the NO concentrations in gas streams containing molar ratios of ethanol to initial NO of 8:1 are compared for PYREX® glass and TEFLON® PFA dielectrics. When using the TEFLON® PFA dielectrics, substantially 90% NO removal was obtained with only 48 Watts of plasma reactor power. The calculated molecular energy consumption for this data point was approximately 17 eV per NO representing a 30% decrease in energy consumption as compared to the stream treated with PYREX® glass dielectrics.

Improvements in efficiencies were observed when treating $NO_x$ contained in diesel generator exhaust. Referring to Table 1, results of an untreated stream were compared with results of a stream treated with approximately 4.0 ml/min. of ethanol injectant.

TABLE 3

Ethanol Injection Performance in Diesel Exhaust Stream

| Condition | Percent NO Reduction | Electron Volts/Molecule |
| --- | --- | --- |
| Ethanol Treated | 99.6 | 17.3 |
| Untreated | 17.3 | 170.4 |

As also mentioned, the ethanol offering a high vapor pressure and solubility in water offers ease in application. Its characteristic high vapor pressure renders it to be readily injected into the gas stream in either vapor or liquid form. Its high solubility in water also ensures that it may be readily scrubbed from the system along with the converted nitrogen dioxide ($NO_2$) from the exiting gas stream.

In comparison to other preinjection compounds, an increase in efficiency may be achieved, however, not without increased complication in the overall process and apparatus. Many hydrocarbons have a lower vapor pressure which makes injection into the gas stream difficult except in higher temperature conditions. Also, as the gas stream cools, the injectant tends to condense on the surface of the electrodes shorting out the voltage circuit. Other possible injectants are not water soluble and therefore complicates the scrubbing process.

As illustrated in FIGS. 1 and 2, the apparatus is pack-free, that is, free of any additional dielectric material, such as glass wool packing. Accordingly, the gas stream flows through the reaction zone(s) or gap(s) substantially unimpeded.

It may be seen that the system of the present invention may be readily incorporated in various embodiments to provide a non-thermal plasma treatment of effluent or exhaust gas. It is understood by one of ordinary skill in the art that the voltage applied, the frequency of the voltage applied, the gas stream flow rate, temperature and residence time in the reactor chamber may affect power consumption and therefore efficiency of the apparatus. It is also understood by one of ordinary skill in the art that the configurations and dimensions of various components, such as the plasma chamber, the electrodes, the spacers and the insulation may affect the efficiency and throughput of the apparatus. For example, the electrodes may be variously configured as two dimensional or three dimensional conductive elements. They may be rectilinear or tubular, or combinations thereof. Any one or combinations of these parameters may be tailored to generate specific reactive species and/or to target specific constituents in the exhaust gas for conversion. In that regard, various alternative techniques and configures may be employed departing from those disclosed and suggested herein.

Consequently, it is to be understood that the scope hereof should be determined in accordance with the claims as set forth below.

What is claimed is:

1. An apparatus for converting nitric oxide in exhaust gas into nitrogen dioxide, comprising:
    a plasma reactor having a plurality of electrodes defining at least one reaction zone receiving the gas, said electrodes each having an electrode plate and a fluoropolymeric substance applied to said electrode plate; and
    a voltage supply connected to the electrodes to provide a voltage across the electrodes,
    said electrodes being of a planar configuration and arranged in parallel formation; and an ethanol bath through which at least a portion of the gas is diverted.

2. A non-thermal plasma reactor for treating nitric oxide-bearing exhaust gas, comprising:
    a plurality of electrodes defining at least one reaction zone receiving the gas, said electrodes each having an electrode plate and a fluoropolymeric substance applied to said electrode plate;
    a voltage supply connected to the electrodes to provide a voltage across the electrodes; and an ethanol bath through which at least a portion of the gas is diverted.

3. The non-thermal plasma reactor in accordance with claim 2, wherein said plurality of electrodes are of a planar configuration and are arranged in parallel formation.

4. The non-thermal plasma reactor in accordance with claim 2, wherein the electrode plate has two surfaces and said fluoropolymeric substance is applied to the two surfaces.

5. The non-thermal plasma reactor in accordance with claim 2, wherein said electrode plate is embedded in said fluoropolymeric substance.

6. The non-thermal plasma reactor in accordance with claim 2, wherein said fluoropolymeric substance is fluorocarbon.

7. The non-thermal plasma reactor in accordance with claim 2, further comprising spacers of a fluoropolymeric substance, that are positioned between adjacent electrodes to provide a gap therebetween.

8. The non-thermal plasma reactor in accordance with claim 2, further comprising an insulating member of a fluoropolymeric substance, said member being configured with indentations to receive and support said electrodes.

9. An apparatus for converting nitric oxide in exhaust gas into nitrogen dioxide, comprising:
    a plasma reactor having a plurality of electrodes defining at least one reaction zone receiving the gas, said electrodes each having an electrode plate and a fluoropolymeric substance applied to said electrode plate; and
    a voltage supply connected to the electrodes to provide a voltage across the electrodes; and
    an ethanol bath through which at least a portion of the gas is diverted.

10. The apparatus in accordance with claim 9, further comprising a scrubber.

11. The apparatus in accordance with claim 9, further comprising an injector for introducing ethanol into said gas.

12. The apparatus in accordance with claim 9, further comprising an inlet and an outlet, each connected to the plasma reactor.

13. The apparatus in accordance with claim 9, wherein the voltage applied across the electrodes creates an electric field whose strength is above the critical field strength of the gas, but not so high as to establish a condition conducive to sustain arcing between the electrodes.

14. The apparatus in accordance with claim 9, wherein the voltage applied across the electrodes creates a multitude of short-lived current filaments within the gas.

15. The apparatus in accordance with claim 9, wherein reactive species are generated by the plasma reactor, to react with said nitric oxides.

16. The apparatus in accordance with claim 15, wherein the reactive species are electrons promoting primarily electron-molecule collisions in the gas.

17. The apparatus in accordance with claim 9, comprising at least three electrodes arranged in parallel formation defining at least two gaps therebetween through which the gas passes.

18. An apparatus for converting nitric oxide in exhaust gas into nitrogen dioxide, comprising:

a plasma reactor having a plurality of electrodes defining at least one reaction zone receiving the gas, said electrodes each having an electrode plate and a fluoropolymeric substance applied to said electrode plate;

a voltage supply connected to the electrodes to provide a voltage across the electrodes; and an ethanol injector for introducing ethanol into said gas; and an ethanol bath through which at least a portion of the gas is diverted.

19. A non-thermal plasma reactor for treating nitric oxide-bearing exhaust gas, comprising:

a plurality of electrodes defining at least one reaction zone receiving the gas, said electrodes each having an electrode plate;

a voltage supply connected to the electrodes to provide a voltage across the electrodes; and an ethanol bath through which at least a portion of the gas is diverted.

20. The non-thermal plasma reactor in accordance with claim 19, wherein said plurality of electrodes are of a planar configuration and are arranged in parallel formation.

* * * * *

UNITED STATES PATENT AND TRADEMARK OFFICE
CERTIFICATE OF CORRECTION

PATENT NO. : 6,309,610 B1
DATED : October 30, 2001
INVENTOR(S) : Allen J. Nejezchleb et al.

It is certified that error appears in the above-identified patent and that said Letters Patent is hereby corrected as shown below:

Title page,
Item [75], change the name of one of the inventors from "Keith C. Jamison" to -- Keith A. Jamison --.

Signed and Sealed this

Second Day of March, 2004

JON W. DUDAS
*Acting Director of the United States Patent and Trademark Office*